United States Patent Office 3,025,132
Patented Mar. 13, 1962

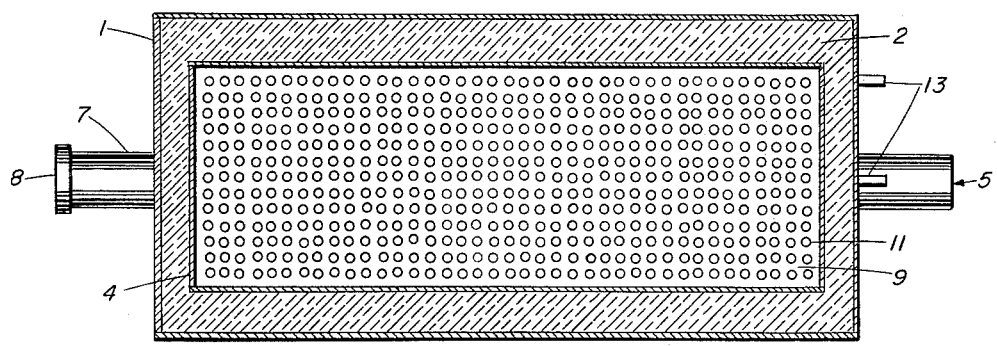
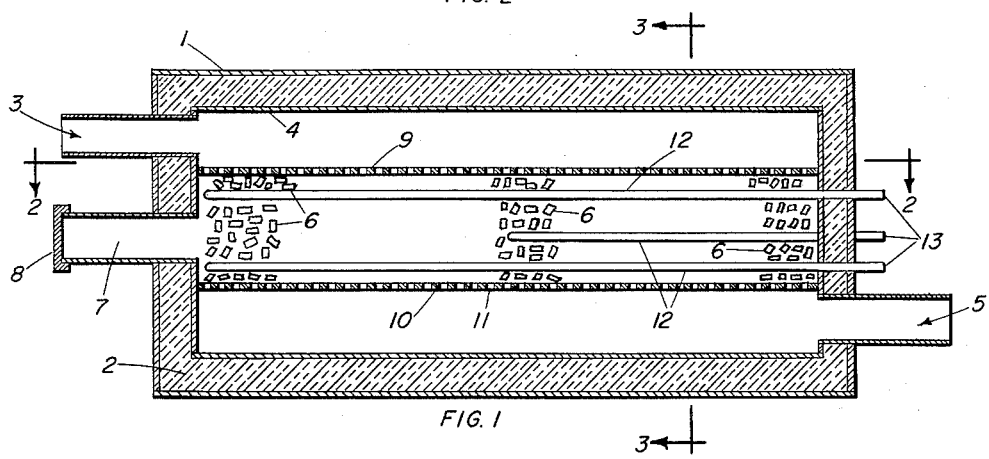
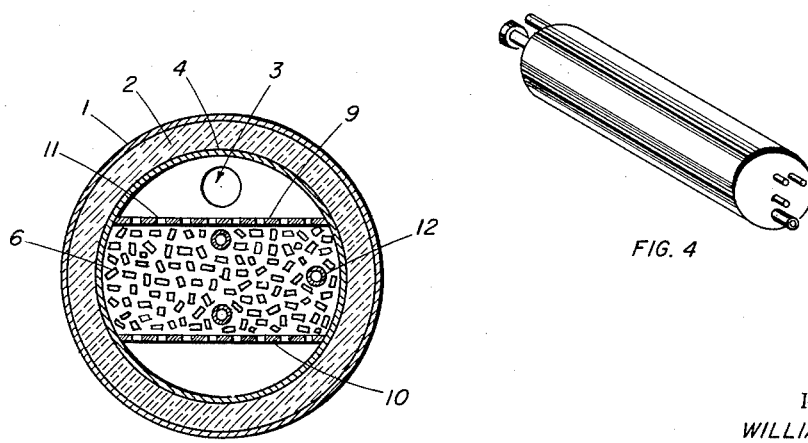
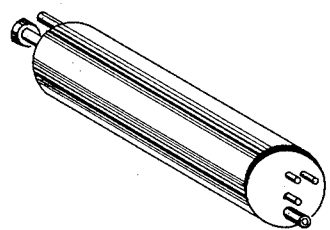

3,025,132
METHOD OF OXIDIZING HYDROCARBON CONSTITUENTS OF EXHAUST GASES
William B. Innes, Stamford, Conn., assignor to American Cyanamid Company, New York, N.Y., a corporation of Maine
Filed Aug. 7, 1959, Ser. No. 832,388
1 Claim. (Cl. 23—2)

The present invention relates to an improved catalyst for the oxidation of hydrocarbon constituents of hydrocarbon combustion exhaust gases, and more particularly to a process for oxidizing the hydrocarbon constituents of hydrocarbon combustion exhaust gases from hydrocarbon fuels whereby the smog-forming potential of such gases is minimized as is the health hazard resulting from their presence in the atmosphere. The catalyst and process surprisingly also appears to partially convert harmful nitrogen oxides to nitrogen.

Exhaust gases from automobiles, particularly olefin and nitrogen oxide components, have been demonstrated to be a primary cause of "photochemical smog" in heavily populated metropolitan centers of this country such as Los Angeles, California. Smog as the term is generally employed is broadly understood to refer to a variety of phenomena which are related to the interaction of nitrogen oxides, hydrocarbons and sunlight. These include a fog-like haze, high oxidant concentration in the atmosphere (mostly ozone), eye irritation, plant damage and the like. In general, smog is defined more fully in an article by W. L. Faith entitled "Nature of Smog" in Chemical Engineering Progress, 53, 406 (1957).

Apart from the above, smog resulting from air pollution raises attendant health considerations not the least of which are some reports linking it to some forms of cancer. Thus the removal or minimizing of smog constitutes a genuine challenge to research.

Some catalysts investigated for treating exhaust gas suffer from serious deficiency in that they are sensitive to lead poisoning derived from leaded hydrocarbon fuels. That is, after 100 hours use their activity may become negligible. Other catalysts require substantial periods of time (10–15 minutes) for "warming up" of the catalytic unit. Thus their optimum efficiency is not realized and there is a considerable period of time during which the effectiveness of the catalysts for oxidation purposes is minimal.

Catalysts described to date are quite dense, thus being characterized by substantial weight with resultant high heat capacity which in substantial part determines the warm up time required for the catalysts to be effective for oxidation purposes.

Basic studies on the importance of various hydrocarbons in causing eye irritation have clearly shown that olefinic components are the most important offenders. This has recently resulted in passage of a law in Los Angeles County restricting olefin content in gasoline. Low molecular weight hydrocarbons (methane and ethane), carbon monoxide and hydrogen appear to make no contribution to photochemical smog, and complete oxidation of these components can lead to overheating of a catalytic unit with consequent damage to catalyst and container unless the latter is constructed from expensive alloy steel. Further, very high temperatures can also cause discomfort to passengers or affect nearby parts of the car unless the unit is well insulated.

Accordingly, it is an object of the present invention to provide an improved oxidation catalyst for selectively oxidizing the smog-forming hydrocarbon constituents and reducing the nitrogen oxide content of hydrocarbon combustion exhaust gases, characterized by low bulk density, thus low heat capacity, and therefore by rapid warm up under the conditions to be encountered in accordance with the present invention.

A further object of the present invention is to provide an improved oxidation catalyst for the oxidation of hydrocarbons from hydrocarbon combustion exhaust gases which requires less weight than catalysts heretofore contemplated for such purposes in order to fill a given size converter or oxidation unit without sacrificing oxidation potential. Apart from lower catalyst cost, the lower weight is reflected in lower fuel consumption.

These and other objects and advantages of the present invention will become more apparent from the detailed description set forth hereinbelow.

In accordance with the present invention, an oxidation catalyst containing a major portion of alumina and a minor portion, at least 12% by weight of vanadia is prepared in which the said catalyst is characterized by a bulk density of less than 0.7 g./cc.

The oxidation catalyst of the present invention may contain from between about 12 and about 30% and preferably from between 15% and 25% by weight of vanadia and the balance essentially alumina. However, in addition to the vanadia or in lieu of a minor portion thereof, as for example up to 4%, amounts of other oxidation promoting materials, as for example, nickel, chromia and iron oxide may be present in the catalyst of this invention.

A critical feature of the catalyst of this invention is that it is characterized by a bulk density of less than 0.7 g./cc. Bulk density as described herein is measured by slowly pouring the catalyst into a 100 ml. graduated cylinder, density being given by the weight per unit volume.

While the density of the catalyst, as described above, is a value less than 0.7 g./cc., in general, the range is from between 0.40 and 0.7 g./cc. Substantially below 0.40 g./cc. the attrition resistance of the catalyst becomes unacceptable.

The bulk density of the final catalyst is for the most part controlled by controlling the bulk density of the alumina component of the catalyst. Alumina of suitable activity for catalytic purposes is prepared by precipitation from a solution of an alkali metal aluminate such as sodium or potassium aluminate. If hydrated alumina prepared by precipitation procedures from alkali metal aluminate is spray dried, a light fluffy product of low apparent density usually within the range of about 0.2 to about 0.3 g./cc. is obtained. Such a base material is eminently suited for use in the present invention and may be prepared in accordance with the procedure described in U.S. Patent No. 2,657,115, the subject matter of which is incorporated herein by reference.

It will be appreciated that converting the spray dried alumina to a formed catalyst whether pelleted or extruded, increases the density of the material considerably. Thus a spray dried base having a bulk density of 0.2 to 0.3 g./cc. after pelleting or extrusion can have a substantially higher bulk density depending upon the conditions employed. The important point is that the final formed catalyst should be characterized by a density below 0.7 g./cc.

In accordance with the present invention, a suitable spray dried precipitated alumina characterized by a bulk density of from between about 0.2 and about 0.3 g./cc. is intimately contacted with a compound which yields vanadia after calcination such as ammonium meta vanadate or the complex resulting from the interaction of ammonium meta vanadate oxalic acid and ammonia described in U.S. Patent 1,914,557. The alumina prior to addition of vanadia component may be in powder, pellet precipitate or extrudate form. It may be dried or calcined as for example, a temperature of from 200–800° C.

Various ways of achieving intimate contact of a high amount of vanadia with low density alumina are illustrated in the examples hereinafter.

Spray drying of the alumina may be accomplished by any suitable spray dryer. One that has been employed with success is described in U.S. Patent No. 2,644,516, dated July 7, 1953. Although gas inlet temperatures of up to 1300° F. may be employed, the temperature of the drying gases entering into the spray drying chamber is preferably controlled within the range of about 400 to 1000° F. so that the catalyst material is converted into set partially dehydrated microspheroidal gel-like particles. Spray drying of alumina hydrate usually results in a moisture content of from between 15–30% in the spray dried product.

Catalysts prepared in accordance with the general procedure set forth hereinabove and in accordance with the present invention are further characterized by a surface area after calcination as measured by a nitrogen absorption of at least 100 square meters per gram. Usually the surface area is from 200 up to about 300 m.$^2$/g. These catalysts may be pelleted by employing conventional pelleting equipment or extruded by employing known extrusion techniques followed by calcination. Thus, for example, calcination may be effected at a temperature of 600° C. for 2 hours or more.

The diameter of the formed catalyst should be less than about 0.2″ per unit because of diffusion, lead poisoning and activity considerations, but for pressure drop and attrition considerations should not be less than about 0.1″ per unit. It is an important aspect that the catalyst be characterized by the above physical state in order that a substantial number of pellets may be employed in a given converter unit of sufficient size and configuration while avoiding the development of significant back pressure in an exhaust system which would have the effect of diminishing the power and efficiency of a given engine.

The catalyst pellets of the present invention are employed in a process for oxidizing hydrocarbon constituents of hydrocarbon combustion exhaust gases which comprises contacting such gases with a catalyst characterized as set forth hereinabove.

These hydrocarbon combustion exhaust gases normally leave the combustion chamber of most conventional internal combustion engines as for example, those employed in automobiles and trucks at a temperature of from between about 300 and 650° C. Before the catalyst for the purpose of this invention can become very effective it normally must achieve a temperature of about 350° C. The higher the density of a catalyst the higher its heat capacity, therefore the longer period of time required for the catalyst to become effective for its intended purpose. This will be demonstrated more fully hereinafter.

The alumina of the catalyst of this invention is gamma alumina as distinguished for example from eta alumina. It is essential that the said alumina be gamma if a catalyst of acceptable stability under conditions of use is to result. Additionally, eta alumina is normally a substantially more dense material than gamma when prepared in accordance with known procedures.

In employing the catalyst of this invention and the process of the present invention catalysts, pellets are normally introduced into a converter unit which in turn may be inserted into the exhaust system of the internal combustion engine. "Converter," as that term is employed herein, refers to any suitable container for the catalyst particles of this invention which preferably is capable of being readily inserted into the exhaust system of an internal combustion engine as, for example, in lieu of a muffler before or after the exhaust manifold or other convenient locations. Such a converter should be employed in the system in a region where the temperature of the exhaust gases after warm up is from between 300 to 650° C. One such converter employable in the process is illustrated in the accompanying drawing in which:

FIGURE 1 is a side elevation of said converter;
FIGURE 2 is a top sectional view along the line 2—2 of FIGURE 1;
FIGURE 3 is a vertical sectional view along the line 3—3 of FIGURE 1; and
FIGURE 4 is a perspective view of the converter.

This converter unit consists of a cylindrical housing 1 insulated by asbestos or other suitable insulating material 2 having an inlet 3 to its interior 4 an outlet 5 therefrom.

Catalyst pellets 6 are placed in the interior 4 of the converter unit through opening 7 having a removable cap 8 positioned thereover. Catalyst pellets 6 are positioned thereover. Catalyst pellets 6 are positioned between vertically spaced parallel grid plates 9 and 10 having uniform perforations therein 11. In order to determine accurately the temperature in various parts of the catalyst bed of the converter unit, thermowells 12 are positioned in the converter unit between grid plates 9 and 10 with exposed ends 13 so that temperature readings within the catalyst bed are readily obtainable.

The inlet pipe 3 and the outlet pipe 5 may be threaded (not shown) or otherwise suitably mechanically adapted for being removably positioned into an exhaust system as, for example, at about a foot's distance from the exhaust manifold.

In operation exhaust gases entering through inlet 3 at high velocity are forced down through upper grid plate 9 through the catalyst particles 6 fixed through grid plate 10 and out through outlet pipe 5 ultimately for transmission into the atmosphere.

Oxidation of exhaust gases in accordance with the invention need not be effected in the presence of added oxygen, however, added oxygen in amounts of from between 0 and 50% by volume of the exhaust gases fed to the converter, can be employed with good success. Thus oxygen preferably as air may be fed to the exhaust line, or directly to the converter, as by means of a suitable venturi device or air pump.

In order that the present invention may be more fully understood, the following examples are given primarily by way of illustration. All parts and percentages are by weight unless otherwise specifically designated.

EXAMPLE 1

A heel of water was placed in a suitable strike tank, the agitator started and stoichiometrical equivalent quantities of sodium aluminate (29% Al$_2$O$_3$) and aluminum sulfate (commercial alum) added, together with a sufficient amount of water, to maintain the solids level at about 7% and a pH level of about 9. The pH of the resulting slurry was adjusted to about 7 and the slurry aged for about one-half hour. The slurry was then filtered twice and the filtrate washed to reduce sulfate and sodium ions below acceptable levels.

Thereafter the washed filter case was injected through stationary nozzles into a descending rotating column of gas having an inlet temperature of about 600°–700° F. and an outlet temperature of about 250° F. and thereby dried to a heat set gel having a moisture content of about 20–25% as measured by loss on ignition at 1100° F.

The spray dried alumina gel is characterized by a bulk density of about 0.2 g./cc.

EXAMPLE 2

Relative proportions of one and one-half parts of a spray dried alumina prepared as in Example 1, was mulled with 1 part of washed filter cake as described therein, with 2% of graphite as a lubricant, and extruded into ⅟₁₆″ x ³⁄₁₆″ particles. The extrudates were dried and then calcined at 1100° F. for 1 hour. The pellets were characterized by a bulk density of 0.56 g./cc.

EXAMPLE 3

A slurry of 115 grams $NH_4VO_3$ and 160 grams of $H_2O$ was heated to 60° C. 184 grams of oxalic acid was added slowly over a period of 15 minutes. After the evolution of $CO_2$ gas had ceased, 42 g. of 28% $NH_3$ was added maintaining the solution at 50° C.

This "solution" was added to 657 grams of Alcoa H–151 activated alumina spheres (⅛" diameter). The alumina and "solution" was aged for a period of 48 hours. The resultant catalyst was washed lightly to remove uncombined vanadia. The catalyst was calcined in a muffle furnace for 4 hours at 660° F. The final product contained 8% $V_2O_5$.

EXAMPLE 4

Two hundred grams of Alcoa H–151 activated alumina spheres (⅛" diameter) was mixed with 2300 grams of a water slurry of ammonium metavanadate (150 g./liter). The mixture was heated in a 220° F. oven to effect surface reaction of vanadia with alumina by the reaction:

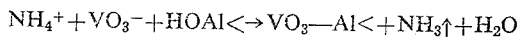

After twice evaporating to dryness the alumina spheres were lightly washed to remove uncombined vanadia. The product was calcined for 1 hour at 1100° F. On analysis for $V_2O_5$, it was found to contain 10% $V_2O_5$.

EXAMPLE 5

Seventy-seven grams of alumina extrudates prepared as in Example 2 were heated overnight in an open container in an oven at 240° F. with 1 liter of $NH_4VO_3$-water slurry containing 150 g. $NH_4VO_3$. Water was added and the mix again evaporated to dryness. Excess ammonium meta vanadate was then removed by a washing prior to final drying and calcination for 1 hour at 1100° F. The final product contained 9% $V_2O_5$, and was characterized by a bulk density of .67 g./cc.

Oxalic acid was added over a 30 minute period to a water slurry of ammonium meta vanadate while maintaining the temperature at 60±5° C. using the following amounts of material:

300 g. $NH_4VO_3$
345 g. $H_2O$
486 g. $H_2C_2O_4$

Ammonia solution (108 g. 28.1% $NH_3$) was then added allowing the temperature to go to 72° C.

Part of the resultant "solution" (272 g.) was added to 247 grams of alumina extrudates prepared as in Example 2. The volume added was slightly in excess of that necessary to saturate the pores. The saturated catalyst was calcined for 1 hour at 1100° F. before usage. The final product contained 14% $V_2O_5$ and was characterized by a bulk density of .68 g./cc.

EXAMPLE 7

Fifty grams of nickel nitrate hexahydrate was added to 2945 g. of a 3% solution of ammonium metavanadate at 80–90° C. One hundred and forty-six grams of alumina extrudates prepared as in Example 2 were placed in a wire basket and were dipped in this solution and then calcined in a 1100° F. muffle furnace for 5–10 minutes repeatedly until a product containing 17.8% $V_2O_5$ and 4.4% NiO was obtained. The catalyst was characterized by a bulk density of 0.72 g./cc.

EXAMPLE 8

One hundred and forty-six grams of alumina extrudates prepared as in Example 2 were placed in a wire basket and repeatedly dipped at 85–95° C. in 2800 ml. of an initially saturated solution of ammonium metavanadate. Between dips the pellets were calcined for 5–10 minutes. The final product contained 13.1% $V_2O_5$. The catalyst was characterized by a bulk density of .64 g./cc.

EXAMPLE 9

Forty-two grams of ammonium metavanadate and 30 grams of water were heated on a steam bath to 80–90° C. To this slurry, 68 grams of oxalic acid were added slowly over a period of 5 minutes. After evolution of carbon dioxide had ceased, 17 grams of 28.1% ammonia were added.

To this resultant product, 324 grams of spray dried alumina hydrate prepared as in Example 1, and water in the amount just enough to maintain a liquid slurry, were added.

The vanadia-alumina mix was aged for one-half hour at 80–90° C. It was then dried overnight at 250° F. After pelletizing, the catalyst was then calcined for one hour in a muffle furnace set at 1100° F. The final product contained 10% $V_2O_5$, and was characterized by a bulk density of .42 g./cc.

EXAMPLE 10

Forty-two grams of ammonium metavanadate and 30 grams of water were heated on the steam bath to 80–90° C. Sixty-eight grams oxalic acid were added slowly over a period of 5 minutes. After evolution of carbon dioxide had ceased, 17 grams of 28.1% ammonia were added.

To this product, 167 grams of spray dried alumina hydrate (prepared as in Example 2) and water, in the amount just enough to maintain a liquid slurry, were added.

The vanadia-alumina mix was aged for one-half hour at 80–90° C. It was then dried overnight at 250° F. After pelletizing, the catalyst was then calcined for one hour in a muffle furnace set at 1100° F. The final product contained 19% $V_2O_5$ and was characterized by a bulk density of .40 g./cc.

EXAMPLE 11

Oxalic acid was added to a slurry of ammonium metavanadate at 50–60° C., with stirring until $CO_2$ evolution ceased. Ammonia was added after cooling to room temperature. The quantities were as follows:

481 g. $NH_4VO_3$
554 g. water
780 g. $H_2C_2O_4$
173 g. of 28.1% $NH_3$

Spray dried alumina hydrate (1250 grams prepared as in Example 2) was mixed with this reaction product in a muller. After mulling one hour, the mix was extruded, dried and calcined for one hour at 1100° F. The final product contained 24% $V_2O_5$ and was characterized by a bulk density of .68 g./cc.

EXAMPLE 12

Ammonium metavanadate was added to alumina hydrate filter cake slurry using the quantities below:

481 g. $NH_4VO_3$
890 g. alumina filter cake (prepared as in Example 1)

Oxalic acid (780 grams) was then added at 50–60° C. The mix was cooled to room temperature and 173 grams of 28.1% $NH_3$ water solution added.

The above mix was blended in a muller with 1145 grams of spray dried alumina, extruded, dried and calcined. The final product contained 22% $V_2O_5$ and was characterized by a bulk density of .67 g./cc.

In order to compare the effectiveness of the catalysts prepared in accordance with certain of the above illustrative examples, Table I hereinbelow is set forth.

Table I

| Example | Procedure | 8-12% $V_2O_5$ Percent Conversion | | | | 12-16% $V_2O_5$ Percent Conversion | | | | 18-24% $V_2O_5$ Percent Conversion | | | |
|---|---|---|---|---|---|---|---|---|---|---|---|---|---|
| | | Exhaust [a] HC | $C_2H_4$ [b] | $C_3H_6$ [c] | B.D. g./cc. | Exhaust [a] HC | $C_2H_4$ [b] | $C_3H_6$ [c] | B.D. g./cc. | Exhaust [a] HC | $C_2H_4$ [b] | $C_3H_6$ [c] | B.D. g./cc. |
| 3 | "oxalate" to activated beads | 35 | 35 | | .86 | | | | | | | | |
| 4 | ion exchange—activated beads | 25 | 22 | | .89 | | | | | | | | |
| 5 | ion exchange—extrudates of Example 2 | 30 | 49 | 59 | .67 | | | | | | | | |
| 6 | "oxalate" on extrudates of Example 2 | | | | | 66 | 57 | 66 | .68 | | | | |
| 7 | metavanadate multiple impregnation of extrudates of Example 2—4% NiO | | | | | 66 | 77 | 78 | .72 | | | | |
| 8 | metavanadate multiple impregnation of extrudates of Example 2—0% NiO | | | | | 66 | 77 | 73 | .64 | | | | |
| 9 | "oxalate" to spray dried alumina of Example 1—pelleted | 25 | 18 | | .42 | | | | | | | | |
| 10 | "oxalate" to spray dried alumina of Example 1—pelleted | | | | | | | | | 72 | 70 | | .40 |
| 11 | "oxalate" to spray dried alumina of Example 1—extruded | | | | | | | | | 66 | 77 | 86 | .68 |
| 12 | "oxalate" to filter cake of Example 1—extruded | | | | | | | | | 68 | 77 | 88 | .67 |

[a] = Exhaust gas hydrocarbon (0.5% HC) oxidation at 410° C. and 110 min.$^{-1}$ space velocity (STP) including 10% added air.
[b] = Ethylene (0.5% HC) oxidation in air at 410° C. and 110 min.$^{-1}$ space velocity (STP).
[c] = Propylene (0.5% HC) oxidation in air at 315° C. and 110 min.$^{-1}$ space velocity (STP).
B.D. = Bulk density
H.C. = Hydrocarbon Table I hereinabove demonstrates that catalysts prepared according to the present invention are at least equally as effective as similar high density catalysts.

This means that substantially less catalyst is required to do the same amount of work. In addition, because of the differences in density, catalysts of this invention are characterized by substantially shorter warm up times and, therefore, are effective for hydrocarbon oxidation that much sooner.

With respect to Table I above, it should be noted that exhaust gas hydrocarbon conversions upwards of 50%, result in 90% or better effective removal of harmful olefinic hydrocarbons, with smaller percent conversions resulting in correspondingly lower effective removal of these materials. The balance of hydrocarbon in the exhaust are innocuous methane, ethane and relatively harmless ethylene. Thus in Table I where the hydrocarbon conversions are reported at values of an excess of 60 and 70%, the result is substantially complete removal of harmful olefinic hydrocarbon. The olefinic content of combustion exhaust gases constitute the principal harmful constituents is discussed in Paper 59-33 "Organic Emission in Smog Formation" by Janet Dickinson, presented at the Air Pollution Control Association of Los Angeles Conference held in June 1959.

Hydrocarbon conversion is defined as:

$$\text{Percent conversion} = \frac{\text{inlet HC} - \text{exit HC}}{\text{inlet HC}}$$

HC = total hydrocarbons in gas as measured by a flame ionization detector. Such a device and its use is described by I. G. Williams and R. A. Dewar in "Nature," volume 181, page 760 (March 15, 1958).

The effectiveness of catalysts of this invention for hydrocarbon conversion and particularly, harmful olefins, will be demonstrated in Table II below with respect to the catalyst of Example 11. The values reported under the headings methane, ethane, etc. opposite "Inlet" and "Outlet" are reported in parts per million (p.p.m.). "Inlet" refers to exhaust gas composition entering a conversion unit, "Outlet" refers to the composition exiting such a unit, each relative to the components identified.

Table II

| | Methane | Ethane | Ethylene | Acetylene | Propylene | $C_4+$ |
|---|---|---|---|---|---|---|
| Inlet | 520 | 100 | 590 | 890 | 90 | 60 |
| Outlet | 550 | 100 | 228 | 8 | 0 | |

Table II demonstrates the effectiveness of catalysts of this invention relative to acetylene, propylene and the relatively innocuous ethylene. Since general experience has demonstrated that higher homologous olefins such as butylene and the like are more easily oxidized than propylene, it may be assumed that their oxidation is complete.

Four catalysts (Examples 7, 8, 11 and 12) were exposed to potentially severe deactivation conditions. These conditions included:

(1) Regular Lauson engine exhaust (leaded gasoline) at 410° C. with 10% added air for 27 hours.

(2) Regular Lauson engine exhaust (leaded gasoline) at 410° C. with no added air for 100 hours.

(3) Lauson exhaust from lead fortified gasoline (8 cc./gal.) for 17 hours at 410° C.

(4) Air saturated with lead tetraethyl at 27° C. for 17 hours at 315° C.

Rate constants for oxidation of ethylene, propylene and exhaust gas were determined after the various treatments. Lead contents of the catalysts after the run ranged from 13 to 16%. Over-all retention of strength and activities were as follows:

Property: Percent retention of initial value
Crush strength _____ 75–85
Propylene oxidation activity _____ 60–65
Ethylene oxidation activity _____ 53–100
Exhaust HC oxidation activity _____ 60–80

Indications from the data at various stages were:

(1) The primary deactivation (ca. 30%) resulted from the treatment with lead tetraethyl in air.

(2) The 100 hr. treatment without added air which might reduce $V_2O_5$ to lower valence surprisingly resulted in no significant deactivation.

(3) Activity for exhaust gas oxidation without added air is about 65% of that with added air (10% of total exhaust).

(4) The higher $V_2O_5$ catalysts (18–24%) were substantially equivalent in oxidation activity while the lower vanadia (13.1% $V_2O_5$) catalyst of Example 8 was significantly lower in this respect at the end of the test.

Measurements show that exhaust gas from a car manifold very rapidly (ca. 1 min.) reaches a steady state temperature in the range of 450–650° C. depending on motor speed.

Since inlet temeprature to a catalytic muffler can be assumed to be constant and there is little heat of reaction up to temperatures where oxidation starts, warm up time can be readily calculated. For example, if we assume an adiabatic muffler containing 0.3 cubic feet of catalyst and inlet temperature of 400° C., the calorific requirements Q to heat the catalyst to 400° C. would be:

For bulk density=55 lbs./cu. ft. (.88 g./cc.):
$Q$=(cu. ft. cat.) (lbs. cat./cu. ft.) (grams/lb.) (heat cap. of cat.) (temp. rise)
Heat capacity of catalyst=.24 cal./g./° C.
Temp. rise=400–25=375° C.
Substituting:

$$Q = 0.3 \times 55 \times 452 \times .24 \times 375 = 6.7 \times 10^5 \text{ cal.}$$

For bulky density=35 lbs./cu. ft. (.56 g./cc.):

$$Q = 0.3 \times 35 \times 452 \times .24 \times 375 = 4.3 \times 10^5 \text{ cal.}$$

The heating effect of the exhaust gas is proportional to temperature difference between inlet gas and catalyst which can be assumed to average about 200° C. The heat transferred to catalyst per cu. ft. of exhaust gas would then be:

$Q$=(heat cap. of exhaust/g.) (g. exhaust gas/cu. ft.) ×temperature difference
$= .25 \times 23 \times 200 = 1.15 \times 10^3$ cal./cu. ft.

The number of cubic feet of exhaust gas required for warm up is then:

For "high density" catalyst:

$$\text{cu. ft.} = \frac{6.7 \times 10^5}{1.15 \times 10^3} = 5.8 \times 10^2$$

For "low density" catalyst:

$$\text{cu. ft.} = \frac{4.3 \times 10^5}{1.15 \times 10^3} = 3.7 \times 10^2$$

Warm up time assuming a normal exhaust flow of 50 cu. ft./min. would then be:

For high density catalyst $$\text{Warm up time} = \frac{580}{50} = 11.6 \text{ min.}$$

For low density catalyst $$\text{Warm up time} = \frac{370}{50} = 7.4 \text{ min.}$$

Accordingly, catalysts contemplated by this invention require about two-thirds of the warm up time of high density catalysts. This has practical significance in that in short run, high density catalyst is much less effective.

It has been noted that the presence of substantial amounts of sodium in catalysts of the type in question is detrimental. Thus the sodium content should normally be maintained at less than 0.2% based on the total catalyst weight and preferably less than 0.1% by weight.

I claim:

A process for oxidizing the hydrocarbon constituents of hydrocarbon combustion exhaust gases from hydrocarbon fuels, which comprises contacting said gases with a catalyst containing a major portion of alumina and a minor portion, between about 12% and about 30% by weight, of vanadia and characterized by a bulk density of between about .40 and .70 g./cc.

References Cited in the file of this patent
UNITED STATES PATENTS

| | | |
|---|---|---|
| 2,657,115 | Ashley | Oct. 27, 1953 |
| 2,785,141 | Fleck | Mar. 12, 1957 |
| 2,912,300 | Cannon et al. | Nov. 10, 1959 |

UNITED STATES PATENT OFFICE
CERTIFICATE OF CORRECTION

Patent No. 3,025,132                                          March 13, 1962

William B. Innes

It is hereby certified that error appears in the above numbered patent requiring correction and that the said Letters Patent should read as corrected below.

Column 4, lines 15 and 16, strike out "Catalyst pellets 6 are positioned thereover."; line 60, for "case" read -- cake --.

Signed and sealed this 19th day of March 1963.

(SEAL)
Attest:

ESTON G. JOHNSON
Attesting Officer

DAVID L. LADD
Commissioner of Patents